April 15, 1952 C. H. FAY ET AL 2,593,285
OIL WELL FLOWMETER
Filed April 26, 1948

Inventor: C. H. Fay
M. Stephenson
By their Attorney:

Patented Apr. 15, 1952

2,593,285

UNITED STATES PATENT OFFICE 2,593,285

OIL WELL FLOWMETER

Charles H. Fay, Houston, Tex., and Maurice Stephenson, Maracaibo, Venezuela, assignors to Shell Development Company, San Francisco, Calif., a corporation of Delaware Application April 26, 1948, Serial No. 23,336

12 Claims. (Cl. 73—155)

This invention relates to an apparatus for measuring fluid flow rates and pertains more particularly to a flowmeter adapted to be lowered on a wire line into an oil well for determining and recording the flow of fluid therein.

Many types of oil well flowmeters have been proposed and used for fluid flow measurements in boreholes, but these devices are generally open to various objections. A type of flowmeter which measures the flow in a borehole, converts these measurements into electrical signals and transmits these signals through an electrical conductor to the surface where said signals are recorded, is objectionable because of the high cost of the recording apparatus and insulated cables required.

Flowmeters of a type incorporating a self-contained recording system are generally too cumbersome to be used for measuring flows in small size well tubing, such as tubing having an inside diameter of 2 inches. This type of flowmeter has the further disadvantage of not being able to measure low flow velocities, e. g. velocities of less than 10 cm. sec. Impeller or vane-type flowmeters are generally not capable of measuring small flows because the impeller shaft, which actuates the recording device, must pass through a stuffing box or other suitable fluid-tight seal in the housing of the recording device. Since the fluid flow must overcome the friction of the seal on the shaft of the impeller, a low velocity flow of fluid does not actuate the impeller, thus rendering the device inoperative.

It is therefore an object of this invention to provide an apparatus adapted to be lowered on a wire line to any predetermined position in a borehole for measuring and recording the rate and direction of flow of a fluid therein even though the velocity of said fluid is very low.

It is also an object of this invention to provide an oil well flowmeter of simple design and sturdy construction for measuring and recording the fluid flow in even the smallest sizes of well tubing or casing.

A further object of the invention is to provide an oil well flowmeter that may be lowered on a wire line into a borehole for measuring and recording the flow of fluid therein over a desired time interval or series of such intervals, the length of each of said intervals being determined and controlled by the operator when the flowmeter is positioned in the borehole.

Still another object of this invention is to provide an oil well flowmeter having a vane or impeller-actuated recording device enclosed in a fluid-tight housing wherein the normal stuffing box surrounding the impeller shaft is eliminated to minimize frictional losses.

These and other objects of this invention will be understood from the following description of a preferred embodiment of the invention and from the accompanying drawing, wherein.

Briefly, the flowmeter structure comprises a tubular housing closed at its upper end, transverse wall means inside the tubular housing intermediate the ends thereof forming a closed upper chamber and a lower chamber open to the space outside the housing, a spider in the lower end of said open chamber, an impeller having a vertical shaft rotatably mounted between the spider and the transverse wall means, fluid outlets through the tubular wall of the lower chamber, said outlets being located above the impeller, a speed reducing gear train positioned within the upper chamber and near the bottom thereof, said gear train having a lower high-speed shaft and an upper low-speed shaft, a first permanent magnet attached to the high-speed shaft of the gear train and positioned adjacent the transverse wall means, a second permanent magnet attached to the impeller shaft and positioned adjacent the transverse wall means, whereby said first and second magnets form a magnetic coupling through the transverse wall means so that the first magnet and the shaft attached thereto will be rotated when the second magnet on the impeller shaft is rotated, recording means attached to the low-speed shaft of the gear train for recording the fluid flow, and timing means operatively connected to said recording means.

Figure 1:
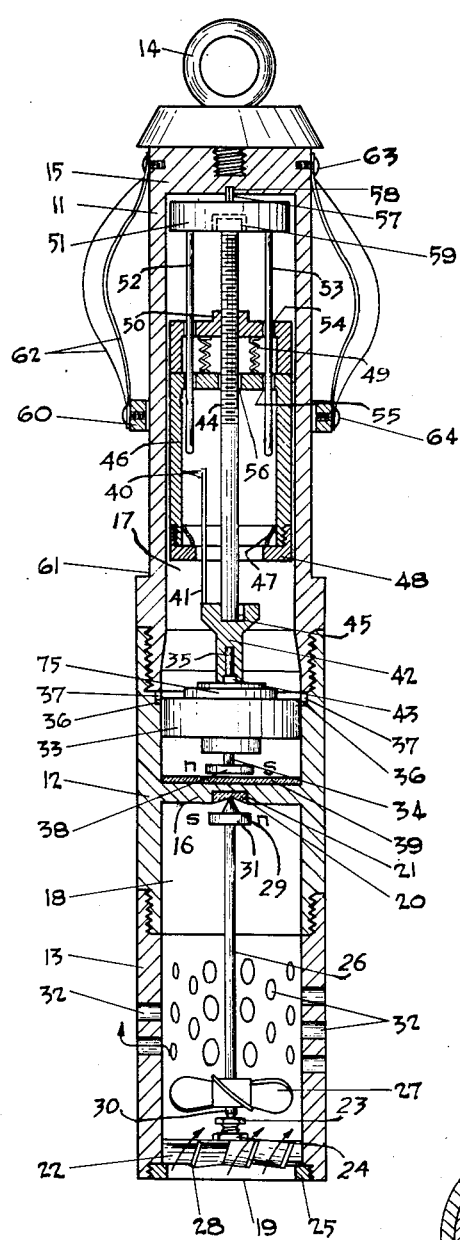
Figure 1 is a longitudinal view, partly in cross section, of an embodiment of the oil well flowmeter of the present invention.

Referring to Figure 1, the housing of the flowmeter consists of upper, middle and lower tubular sections 11, 12 and 13, respectively, secured together by screw threads or other means. These sections are preferably made of a non-magnetic material such as stainless steel. A ring or hook 14, or other suitable attaching means, is secured to the closed upper end 15 of the upper housing section 11 in any suitable manner, as by screw threads, welding, etc. By means of the ring 14, a wire line or cable may be attached to the flowmeter for lowering it into the borehole of a well, or into well tubing or casing. A transverse wall member 16 may be integrally formed, or fixedly secured in a fluid-tight manner, in the center section 12 of the tubular housing. This transverse wall member 16 effectively divides the tubular housing into a closed upper chamber 17 and a lower chamber 18 which is in communication with the space outside the housing through the lower open end 19 of the lower section 13 of the tubular housing.

A jewel bearing (and its mounting) 20 is secured to the lower side of the transverse wall member 16 in any suitable manner, as by being press-fitted in a centrally located recess 21. Positioned in the open end of the lower tubular housing section 13 is a spider 22 having secured thereto a second jewel bearing (and its mounting) 23. This lower jewel bearing 23 is preferably of the shock-proof type being spring-mounted to protect it from any sudden shock. The vertical position of this jewel bearing 23 may be adjusted by screwing it in or out, and then fixed by tightening the locking nut 24. The spider is held in position by any suitable means as by a holding ring 25 in a screw-threaded attachment with the lower section of the housing 13. Rotatably mounted in a normally vertical position between the upper jewel bearing 20 and the lower jewel bearing 23 is an impeller shaft 26 having pivots 29 and 30 at its upper and lower ends respectively and carrying near its lower end an impeller 27. The shaft 26 and impeller 27 are mounted coaxially with the tubular housing section 13, said impeller 27 being mounted for rotational movement in a horizontal plane. A vane-type or bladed impeller is preferred but a screw-type or other type impeller may be used satisfactorily. If desired, the vanes 28 of the spider 22 may be sloped as shown in Figure 1, so as to direct a fluid flow against the impeller 27.

Preferably, the pivots 29 and 30 are removable so that a new pivot may be installed in the event one becomes damaged. The pivots may be of any hard, corrosion-resistant metal that will not be unduly affected by the conditions under which the pivots are used. Fixedly secured to and carried by the impeller shaft 26 near its upper pivot 29 is a permanent magnet 31. This magnet 31 is positioned on the shaft 26 so as to rotate in a horizontal plane adjacent to, but not contacting the transverse wall member 16. A series of perforations 32, which may be punched, drilled or formed in any desired manner in the wall of the lower section 13 of the tubular housing, serve as fluid outlet means from the lower chamber 18. It is essential that these perforations be located above the impeller 27 so that fluid entering the open end 19 of the housing may flow past and rotate the impeller 27 before being discharged through the perforations and back into the well casing again.

Fixedly positioned in the lower end of the closed chamber 17 is a speed-reducing gear train 33 having a high-speed shaft 34 extending downward toward the transverse wall member 16 and a low speed shaft 35 extending upwards, said shafts 34 and 35 being substantially coaxial with the middle section 12 of the housing. The gear train 33 may be fixedly positioned in any suitable manner as by keys 36 attached to the cover of the gear train 33 and engaging keyways 37 in the middle section 12 of the housing. Mounted in a fixed manner on the high-speed shaft 33 is a second permanent magnet 38, preferably positioned for rotation in a horizontal plane just above the transverse wall member 16. If desired, a smooth glass plate 39, such as for example a microscope glass plate, may be placed on the transverse wall member 16 to act as a thrust bearing for shaft 34.

Thus, the two magnets 31 and 38 on opposite sides of the transverse wall member 16 form a magnetic coupling between the impeller shaft 26 and the high-speed shaft 34 of the speed reducing gear train 33. The magnets 31 and 38 may be of any suitable size and type, such as the bar type or air-gap type, but are preferably in the form of flat cylinders (as shown) having their poles (N and S) in the same horizontal planes. While the magnets may be made of any of the magnetic metals, metals having high retentivity and permeability characteristics, such as iron-aluminum-nickel-cobalt alloy, have been found to be particularly satisfactory.

While any suitable recording device may be installed in the closed chamber 17, it is desirable to utilize a recording device of simple and compact design that may be installed in a tubular flowmeter having a small outside diameter such as 1½ inches. Flowmeters of this size can be used in small diameter well tubing or casing which is generally not possible with ordinary flowmeters having self-contained recording devices. Any recording device used may be connected to the low-speed shaft 35 of the speed-reducing gear train 33.

The marking means of the recording device used in this embodiment of the flowmeter comprises a stylus 40 secured to a stylus spring 41 vertically mounted in a fixed manner on a stylus spring holder 42. The spring holder 42 is coaxially mounted on the low-speed shaft 35 of the gear train 33 and is keyed thereto by a key 43 to prevent any slippage of the holder 42 on said shaft 35, said holder 42 being readily removable from the shaft 35. Coaxially mounted in a removable manner in the top of the stylus spring holder 42 in a lead screw 44 which is keyed to said holder 42 by a key 45 so that it will rotate with the holder 42. Thus, any rotation of the low-speed shaft 35 of the gear train 33 will cause a corresponding rotation to the stylus spring holder 42 and to the lead screw 42.

The chart means of the recording device used in the present flowmeter comprises a tubular chart holder 46 adapted to have positioned on its inner face any suitable type of chart (not shown) depending on the stylus used. If, on the other hand, the stylus consists of a sharp metallic pointer, any chart having a soft easily marked surface has been found to be entirely satisfactory. Such a chart may be made of a thin metallic sheet of copper, aluminum, or other material having one side coated with a substance such as lampblack, graphite, etc. A coat of graphite may be spread evenly on the chart by applying to the chart a mixture of colloidal graphite suspended in a volatile organic liquid such as carbon tetrachloride. The chart is firmly held inside the chart holder 46 by any suitable means as by a spring clamp 47 which in turn is secured by a lock ring 48 threadedly connected to the bottom of the chart holder 46.

The chart holder 46 is mounted for vertical movement within the closed chamber 17, being secured in spring suspension by means of springs 49 to a hollow traveling nut 50 in screw-threaded engagement with the lead screw 44, the hollow portion of said nut 50 being adapted to contain said springs 49. As the lead screw 44 is turned in one direction or the other the traveling nut 50 and the attached chart holder 46 are caused to move upwards or downwards within the closed chamber 17. Rotational movement between the chart holder 46 and the traveling nut 50 is prevented by vertical guide means comprising a top member or plate 51 having two downwardly extending rods 52 and 53 which pass through vertical holes 54 in the traveling nut 50 and holes 55 in the top of the chart holder 46. Another hole 56 centrally located in the top of the chart holder 46 permits the extension of the lead screw 44 therethrough. A square pin 57 may be affixed to the upper surface of the top plate 51 of the guide means, said pin being inserted in a recess 58 in the upper section 11 of housing thus centering the guide and chart means and also preventing it from rotating within the chamber 17. A bearing 59 recessed in the bottom surface of the top plate 51 serves as a top bearing for the upper end of the lead screw 44. In order to eliminate any possible reverse rotation of the impeller and prevent the stylus 39 from retracting its path on the chart 66 when the apparatus is being withdrawn from the well, a ratchet mechanism (shown at 75) of any suitable type is mounted on the low-speed shaft 35.

Figure 4:
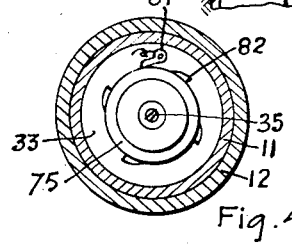
Figure 4 is a cross-sectional view taken along the line 4—4 in Figure 1.

One embodiment of a ratchet mechanism, as shown in Figure 4, may comprise a ratchet wheel 75 fixedly attached to shaft 35 and rotatable therewith. Mounted adjacent the ratchet wheel 75 is a spring-loaded pawl 81 which is arranged to contact the teeth 82 of wheel 75 thus preventing the recording mechanism from running backwards.

Carried on the outside of the upper section 11 of the tubular housing is a ring 60, mounted for sliding movement along said section 11 which is preferably recessed, as at 61, so that the outside diameter of the ring 60 is no greater than that of the other sections 12 and 13 of the housing. Normally bent leaf springs 62 are fastened, as by screws 63 and 64, respectively, to the upper end of the upper housing section 11 and to the sliding ring 60 thus forming a centralizer for the flowmeter in the tubing or casing of any size.

Figure 2:
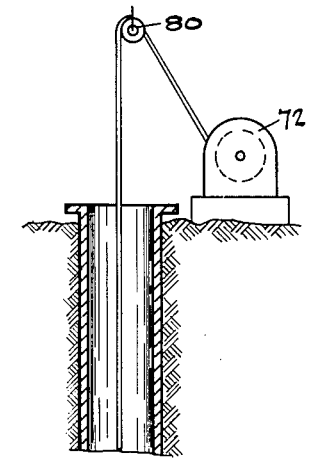
Figure 2 is a diagrammatic view of the flowmeter when positioned in a well casing.

As diagrammatically illustrated in Figure 2, when a test is run on a well to determine the velocity of the flowing fluid therein, the flowmeter of the present invention may be lowered into the well casing 70 by unwinding a wire line 71 from a suitable hoist 72 and reel 80, the end of said cable being attached to the ring 74 on the top of the flowmeter. The centralizer springs 62 maintain contact with the inner walls of the well casing 70 at all times thus positioning the flowmeter coaxially within the casing. When using a flowmeter similar to the one shown in Figure 1, only part of the actual flow of fluid in the well passes through the instrument as the rest of the flow passes upward along the outside of the instrument. A flowmeter of this type, after proper calibration, may accurately measure fluid flows in wells where the velocities of said flows are relatively high. However, when the velocity of the flowing fluid is low, e. g. less than 10 cm. per second, it is desirable to employ a similar flowmeter having a packer element 73, as shown on the embodiment in Figure 2.

In this embodiment (Figure 2) a packer 73 is carried on the outer wall of the lower housing section 13 of the tubular flowmeter, said packer 73 being positioned between the fluid inlet means or open end 19 and the fluid outlet means or perforations 32 in said housing section 13. The packer element 73 may be of the rubber disc type, as shown, or of the self-expanding type or any other suitable type, said packers being well known to those familiar with the art.

Referring to Figure 1, as the flowing fluid enters the open end 19 of the lower section 13 of the flowmeter housing, the fluid is directed by the vanes 28 of the spider 22 against the blades of the impeller 27 causing the shaft 26 to rotate in the jewel bearings 21 and 23. After passing the impeller 27, the fluid is exhausted from the flowmeter through the perforations 32. The turning impeller shaft 26 rotates the magnet 31 carried thereon which causes the upper magnet 38 to rotate at the same speed by the magnetic pull of the unlike poles of the two magnets 31 and 38 which is effectively transmitted through the transverse wall member 16 and the glass plate 29 interposed between said magnets. As stated above the flowmeter housing or at least its middle section 12 should be made of a non-magnetic material so that the magnetic coupling between magnets 31 and 38 is substantially unaffected by the transverse wall member 16 interposed between them.

The rotation of magnet 38 attached to the high-speed shaft 34 of the speed-reducing gear train 33 will thus cause a slow rotation of the low-speed shaft 35 and of the stylus holder 42 and lead screw 44 attached thereto. Thus, the stylus 40 carried by the stylus holder 42 and spring 41 in contact with the chart on the inside of the chart holder 46, is slowly moved around the chart in a horizontal plane marking a line thereon. At the same time, the lead screw 44 is being turned slowly causing the traveling nut 50 to move axially carrying with it the attached chart holder 46. In this manner a continuous helical or spiraling line is marked on the chart. The rate at which the recording takes place depends on the speed reduction ratio of the gear train 33 which may be any desired ratio, for example, 3600 to 1.

As it may be often desirable to record time marks or intervals on the recording chart without removing the flowmeter from the well, means for this purpose are provided in the flowmeter by the spring suspension between the traveling nut 50 and the chart holder 46. The springs 49 normally hold the chart holder 46 and the traveling nut 50 firmly together. However, when any sudden movement of the flowmeter in a direction parallel to its longitudinal axis takes place the springs 49 allow the chart holder 46 to move momentarily downward a fraction of an inch before being returned to the normal position against the traveling nut 50 secured to the lead screw 44. Since the stylus 40 remains in contact with the chart, any vertical movement of the chart holder 46 thus causes a small vertical line to be recorded on the chart. Thus, when the flowmeter is suspended in a well casing 70 at the end of a wire line 11 (Figure 2) a time mark may be recorded on the chart in the flowmeter by given the wire line or cable 71 a short, sudden jerk.

Figure 3:
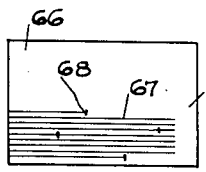
Figure 3 is an illustrative example of a chart obtained by means of the recording device of the present invention.

After fluid flow readings have been taken and recorded by the flowmeter, it is withdrawn from the well casing 70 and partially disassembled to remove the chart from the chart holder 46. As shown in Figure 3, a cylindrical chart 66 on being unrolled contains a number of slightly sloping lines 67, the number depending on the length of the test and the fluid flow in the well. Small vertical marks 68 on the chart indicate the recording of time intervals. The blank space 69 along one edge of the chart is due to overlapping of the chart in the chart holder 46. Since the speed of rotation of the impeller 27 and also of the stylus 40 is a function of the velocity of the fluid flowing in the well, the average velocity of the fluid may be obtained by measuring the length of line 67 inscribed by the stylus 40 on the chart 66 between marks 68 made at the beginning and end of a known interval of time, provided a calibration of the movement of the stylus in terms of velocity has been previously made.

The use of the jewel-bearing mounted impeller 27 in combination with the magnetic coupling comprising magnets 31 and 28 permits extremely low velocities of fluid flow to be recorded by the present device, as this arrangement substantially minimizes friction losses by eliminating the necessity for any stuffing box or packing around the shaft 26.

While the present flowmeter has been described as being especially adapted for use in wells containing small size tubing or casing, it is clear that the flowmeter can also be used in a well in which the casing has not been set, in which case the flowmeter should preferably have the packer element of Figure 2.

We claim as our invention:

1. A fluid flowmeter comprising an elongated housing adapted to be lowered into a well, transverse wall means dividing said housing into a closed upper chamber and an open lower chamber, said housing being provided with inlet and outlet port means for permitting a portion of the well-fluid to pass through the open lower chamber of said housing, fluid flow responsive vane means mounted in said open chamber, rate of flow recording means carried in said closed chamber coaxially therewith, rotatable magnetic coupling means for coupling said vane means and recording means through said transverse wall means, whereby an indication proportional to the fluid flow in the well is transmitted to said recording means, and means comprising a cable suspending said flowmeter in the well for applying time signals to said recording means.

2. In a fluid flowmeter, an elongated housing adapted to be lowered into a well, transverse wall means dividing said housing into a closed upper chamber and an open lower chamber, an axial shaft rotatably mounted in said open chamber, flow responsive vane means carried by said shaft, a second shaft rotatably mounted in said closed chamber coaxially with said first shaft, worm screw means on said second shaft, means coupling said first and second shafts through said transverse wall means for joint rotation, recording means actuated by the rotation of said second shaft in the closed chamber, said recording means comprising a record receiving element and a marker element in contact therewith, one of said elements being rigidly connected with said second shaft for rotation therewith, traveling nut means rotatably supporting the other element on the worm screw means of the second shaft, and means affixed to the housing within said closed chamber bracing said traveling nut means against rotation, whereby the rotation of said second shaft means produces a rotational movement of one of said elements and an axial movement of the other element, said combined movements resulting in a helical record being traced on the record receiving element by the marker element in contact therewith.

3. The device of claim 2, wherein the flow responsive rotatable vane means are positioned within the lower end of open chamber, said open chamber having apertures through the walls thereof above said vane means, whereby said vane means are actuated by the fluid flowing through said chamber between the open lower end thereof and said apertures.

4. The device of claim 3, comprising resilient annular packer means outwardly carried by the flowmeter housing below said apertures, said packer means being adapted to engage the walls of the well.

5. The device of claim 2, comprising a speed reducing gear train having its high speed shaft coupled to said first shaft and its low speed shaft coupled to said second shaft.

6. The device of claim 2, having magnetic means coupling said first and said second shafts through said transverse wall means, said transverse wall means being made of non-magnetic material.

7. The device of claim 6, comprising a first magnet affixed to said first shaft, said magnet having its poles arranged in a plane perpendicular to said shaft adjacent said transverse wall means, and a second magnet affixed to said second shaft, said magnet having its poles arranged in a plane perpendicular to said shaft adjacent said transverse wall means, whereby said first shaft is coupled with said second shaft by the mutual magnetic pull between said magnets.

8. In a fluid flowmeter, an elongated housing adapted to be lowered into a well, transverse wall means dividing said housing into a closed upper chamber and an open lower chamber, an axial shaft rotatably mounted in said open chamber, flow responsive vane means carried by said shaft, a second shaft rotatably mounted in said closed chamber coaxially with said first shaft, worm screw means on said second shaft, means coupling said first and second shaft through said transverse wall means for joint rotation, recording means actuated by the rotation of said second shaft in the closed chamber, said recording means comprising a record receiving hollow cylinder co-axial with said flowmeter housing, traveling nut means engaged with the worm screw means on said second shaft, resilient means supporting said cylinder from said traveling nut means, guide means fixedly carried in said closed chamber in slidable engagement with said traveling nut and said cylinder to prevent rotation thereof, whereby a rotation of said second shaft causes an axial movement of said traveling nut means and of the cylinder supported thereby, and marker means fixedly connected to said second shaft for rotation therewith, said marker means having a point element in contact with the inner face of said hollow cylinder, whereby a helical record line is traced by said point element on said cylinder by the combined axial movement of said cylinder and rotational movement of said marker means, and a marking line transverse to said helical record line is traced by said marker on said cylinder when the latter is caused to move axially away from the traveling nut means against the pull of said resilient means by a sudden acceleration impressed on the flowmeter housing.

9. The device of claim 2 including rotation limiting means carried in said closed upper chamber for maintaining the rotational movement of said recording means in one direction.

10. The device of claim 9 wherein the rotation limiting means comprises a ratchet mechanism secured to said second shaft for maintaining the rotation movement of said marker means in one direction.

11. A fluid flowmeter comprising an elongated housing adapted to be lowered into a well on a cable, transverse wall means dividing said housing into a closed chamber and a chamber open to fluid flow, fluid flow responsive vane means mounted in the open chamber, rate of flow recording means carried in the closed chamber, said recording means comprising a record receiving element and a marker element, means coupling said vane means and said recording means through said transverse wall means for rotatably displacing one of said elements with regard to the other, and resilient means yieldably supporting one of said elements in contact with the other, whereby a sudden acceleration applied to said housing through said cable causes said elements to be displaced with regard to each other by inertia in a direction substantially perpendicular to their rotational displacement.

12. A fluid flowmeter comprising an elongated housing adapted to be lowered into a well on a cable, transverse wall means dividing said housing into an upper and a lower chamber, inlet and outlet means in the housing permitting a flow of well fluid through the lower chamber, flow responsive vane means in the lower chamber, flow-recording means comprising a record-tracing and a record-receiving member in the upper chamber, means actuated by said vane means for displacing said members with regard to each other to produce a flow-responsive record line, means supporting one of said members in the upper chamber against axial motion, and resilient means yieldably supporting the other member in sliding contact with said first member, whereby a line is traced by the record-tracing member on the record-receiving member substantially at right angles to the flow-responsive record line by an acceleration-responsive displacement of said two members produced by manipulation of said cable.

CHARLES H. FAY.
MAURICE STEPHENSON.

REFERENCES CITED

The following references are of record in the file of this patent:

UNITED STATES PATENTS

| Number | Name | Date |
|---|---|---|
| 864,579 | Volz | Aug. 27, 1907 |
| 1,652,472 | Erwin et al. | Dec. 13, 1927 |
| 1,963,904 | Hodgson | June 19, 1934 |
| 2,120,991 | Salnikov | June 21, 1938 |
| 2,334,920 | Gosline et al. | Nov. 23, 1943 |
| 2,379,138 | Fitting, Jr., et al. | June 26, 1945 |